(12) United States Patent
Aoyama et al.

(10) Patent No.: US 11,453,082 B2
(45) Date of Patent: Sep. 27, 2022

(54) ELECTRIC RESISTANCE WELDING ELECTRODE AND METHOD FOR MAINTAINING AIRTIGHTNESS

(71) Applicant: Shoji Aoyama, Osaka (JP)

(72) Inventors: Shoji Aoyama, Sakai (JP); Yoshitaka Aoyama, Sakai (JP)

(73) Assignee: AOYAMA, SHOJI, Osaka (JP)

( * ) Notice: Subject to any disclaimer, the term of this patent is extended or adjusted under 35 U.S.C. 154(b) by 382 days.

(21) Appl. No.: 16/629,058

(22) PCT Filed: Aug. 10, 2018

(86) PCT No.: PCT/JP2018/030085
§ 371 (c)(1),
(2) Date: Jan. 7, 2020

(87) PCT Pub. No.: WO2019/035423
PCT Pub. Date: Feb. 21, 2019

(65) Prior Publication Data
US 2020/0189022 A1 Jun. 18, 2020

(30) Foreign Application Priority Data

Aug. 17, 2017 (JP) .............................. JP2017-170664

(51) Int. Cl.
*B23K 11/30* (2006.01)
*B23K 35/30* (2006.01)

(52) U.S. Cl.
CPC ............ *B23K 11/30* (2013.01); *B23K 35/302* (2013.01)

(58) Field of Classification Search
CPC ..... B23K 11/14; B23K 11/30; B23K 11/3018; B23K 11/10; B23K 11/11; B23K 11/3009; B23K 35/0205; B23K 35/302
See application file for complete search history.

(56) References Cited

U.S. PATENT DOCUMENTS

| | | | | | |
|---|---|---|---|---|---|
| 5,705,784 | A | * | 1/1998 | Aoyama | B23K 11/004 219/119 |
| 6,008,463 | A | * | 12/1999 | Aoyama | B23K 11/31 219/93 |
| 2004/0065642 | A1 | * | 4/2004 | Roddy | B23K 11/3009 219/119 |

FOREIGN PATENT DOCUMENTS

| | | |
|---|---|---|
| JP | 10-6033 | 1/1998 |
| JP | 10-118774 | 5/1998 |

(Continued)

OTHER PUBLICATIONS

International Search Report dated Nov. 6, 2018 in International (PCT) Application No. PCT/JP2018/030085.

(Continued)

*Primary Examiner* — Dana Ross
*Assistant Examiner* — Joe E Mills, Jr.
(74) *Attorney, Agent, or Firm* — Wenderoth, Lind & Ponack, L.L.P.

(57) ABSTRACT

A guide hole is constituted of a large-diameter hole, a medium-diameter hole, and a small-diameter hole. A sliding part fitted in the guide hole is formed of a synthetic resin material. A large-diameter portion of the sliding part is fitted in the large-diameter hole in a slidable state, and a medium-diameter portion is fitted in the medium-diameter hole in a slidable state. A movable end surface of the sliding part is in close contact with a stationary inner end surface of the guide hole. By configuring a width dimension of the movable end surface to be less than half of a thickness dimension of the large-diameter portion, a pressurizing force of the movable end surface is increased and a minute metal piece is pushed from the movable end surface into a base material of the sliding part, and a thickness dimension of the medium-diameter portion is set large.

7 Claims, 4 Drawing Sheets

(56) References Cited

FOREIGN PATENT DOCUMENTS

| JP | 2002-248578 | 9/2002 |
| JP | 2015-147246 | 8/2015 |
| JP | 2017-006982 | 1/2017 |
| JP | 2017-047469 | 3/2017 |
| JP | 2017-136639 | 8/2017 |

OTHER PUBLICATIONS

International Preliminary Report on Patentability and Written Opinion of the International Searching Authority dated Feb. 18, 2020 in International (PCT) Application No. PCT/JP2018/030085.
Extended European Search Report dated May 10, 2021 in corresponding European Patent Application No. 18846518.1.

* cited by examiner

ELECTRIC RESISTANCE WELDING ELECTRODE AND METHOD FOR MAINTAINING AIRTIGHTNESS

TECHNICAL FIELD

The present invention relates to an electric resistance welding electrode and a method for maintaining airtightness in which an end surface of a sliding part made of a synthetic resin material is brought into close contact with or separated from an inner end surface formed on an electrode main body, thereby ventilating and blocking cooling air.

BACKGROUND ART

In an electric resistance welding electrode described in JP 2002-248578 A, JP 2017-006982 A, JP 2017-047469 A, JP 2017-136639 A, a guide hole constituted of a large-diameter hole, a medium-diameter hole, and a small-diameter hole is formed in an electrode main body, a sliding part made of a synthetic resin material and having a guide pin is fitted into the guide hole, an end surface formed on the sliding part is brought into close contact with an inner end surface formed in a portion of the guide hole to block flow of cooling air, and the end surface is separated from the inner end surface to allow flow of the cooling air.

CITATIONS LIST

Patent Literature

Patent Literature 1: JP 2002-248578 A
Patent Literature 2: JP 2017-006982 A
Patent Literature 3: JP 2017-047469 A
Patent Literature 4: JP 2017-136639 A

SUMMARY OF INVENTION

Technical Problems

In the technique described in the above-mentioned patent literatures, regarding a close-contact area of the end surface formed in the sliding part made of the synthetic resin material, no consideration is given to the size of the area and handling of a minute metal piece that has entered the close-contact area. Further, no consideration is given also to minimize misalignment and inclination of the guide pin by a sliding state of the sliding part. Due to these matters, in the electrode described in the above-mentioned patent literature, service life in which airtightness of cooling air can be reliably maintained is shortened.

The present invention is provided in order to solve the above-described problems, and it is an object thereof to eliminate adverse effects associated with intervention of a minute metal piece by increasing a surface pressure of a movable end surface formed on a sliding part made of a synthetic resin material, and to substantially eliminate misalignment and tilting of the guide pin by selecting a sliding state of the sliding part.

Solutions to Problems

The invention according to claim 1 is an electric resistance welding electrode including:

an electrode main body that has a circular cross section and is constituted of a metal material such as a copper material;

a guide pin that has a circular cross section, projects from an end surface of the electrode main body on which a steel plate component is placed, penetrates a pilot hole of the steel plate component, and is constituted of a heat-resistant hard material such as a metal material or a ceramic material; and a sliding part that has a circular cross section, is fitted into a guide hole formed in the electrode main body in a slidable state, has a central portion in which the guide pin is inserted, and is constituted of a synthetic resin material, in which the guide hole is constituted of a large-diameter hole, a medium-diameter hole, and a small-diameter hole, a large-diameter portion formed in the sliding part is fitted into the large-diameter hole in a slidable state with substantially no gap, a medium-diameter portion formed in the sliding part is fitted into the medium-diameter hole in a slidable state with substantially no gap, a ventilation gap through which cooling air passes is formed between a small-diameter hole and the guide pin when the guide pin is pushed down by the guide pin that penetrates the small-diameter hole, a movable end surface formed at a boundary portion between the medium-diameter portion and the large-diameter portion of the sliding part is configured to be in close-contact with a stationary inner end surface formed at a boundary portion between the medium-diameter hole and the large-diameter hole of the guide hole, and the stationary inner end surface and the movable end surface are disposed on a virtual plane where a central axis of the electrode main body perpendicularly intersects, a length in the central axis direction of the electrode main body in which the medium-diameter portion is fitted in the medium-diameter hole is set to be shorter than a length in which the guide pin moves backward during welding, a pressurizing unit that presses the movable end surface against the stationary inner end surface is disposed in the guide hole, by a width dimension of the movable end surface seen in a diametrical direction of the electrode main body being less than half of a thickness dimension of the large-diameter portion at a position where the guide pin is inserted, an area of the movable end surface is configured to be small to increase a pressurizing force of the movable end surface against the stationary inner end surface, and a minute metal piece that enters a close-contact position of the movable end surface and the stationary inner end surface is pushed from the movable end surface into a base material of the sliding part, and by the width dimension of the movable end surface seen in the diametrical direction of the electrode main body being less than half of the thickness dimension of the large-diameter portion at the position where the guide pin is inserted, a thickness dimension of the medium-diameter portion is configured to be set large so as to receive an external force that acts on the guide pin in the diametrical direction of the electrode main body.

Advantageous Effects of Invention

A width dimension of a movable end surface seen in a diametrical direction of an electrode main body is set to be less than half of a thickness dimension of a large-diameter portion at a position where a guide pin is inserted. For this reason, an area of the movable end surface is reduced to increase a pressurizing force of the movable end surface against a stationary inner end surface, and a minute metal piece that has entered a close-contact area between the movable end surface and the stationary inner end surface is pushed from the movable end surface into a base material of a sliding part.

Since a close-contact area of the movable end surface with respect to the stationary inner end surface is reduced, a pressurizing force per unit area, that is, surface pressure is increased. Therefore, a minute metal piece that has reached a close-contact position is sandwiched between the stationary inner end surface that is a metal surface and the movable end surface that is a surface made of a synthetic resin material, and the metal piece is brought to a state of being embedded in a soft base material of the sliding part, and no gap is formed between the stationary inner end surface and the movable end surface.

When the guide pin is pushed down and the movable end surface is separated from the stationary inner end surface and a gap is formed between both the end surfaces, cooling air circulates energetically, and minute metal pieces and carbides, and the like are sent out from a melting local area to an outside of the electrode by airflow. Normally, the sending out is in this manner, but when metal is melted, minute metal pieces that have scattered energetically from a melted portion due to rapid air expansion may collide with an outer peripheral surface of the guide pin and bounce back, move against the airflow, and reach the movable end surface. In such a phenomenon, it is conceivable that movement against the airflow becomes possible because dynamic pressure of airflow acting on a metal piece is low when the metal piece is minute. When such a metal piece adheres to the surface of the movable end surface, a gap is formed between the stationary inner end surface and the movable end surface when the guide pin returns to the standby position, and sealing for circulation of the cooling air is no longer possible. An abnormal behavior of a metal piece as described above does not normally occur if circulation of the cooling air is maintained in good condition, but may occur with a low probability due to some kind of cause as described above.

However, in the present invention, as described above, the metal piece is brought to a state of being embedded in the soft base material of the sliding part, and no gap is formed between the stationary inner end surface and the movable end surface. Thus, it is possible to ensure complete airtightness and avoid economic loss due to air leakage. Furthermore, when air leakage continues, noise accompanying air ejection is generated and working environment for the operator is deteriorated. However, the environment is improved by maintaining airtightness as described above.

In other words, by synergizing increasing of the surface pressure by reducing the area of the movable end surface made of a synthetic resin material and pressing of the minute metal piece strongly against the movable end surface, the metal piece is embedded from the movable end surface into the base material of the sliding part.

The width dimension of the movable end surface seen in the diametrical direction of the electrode main body is set to be less than half of the thickness dimension of the large-diameter portion at the position where the guide pin is inserted. Thus, a thickness dimension of a medium-diameter portion is set large to operate so as to receive an external force acting on the guide pin in the diametrical direction of the electrode main body.

Since the sliding part slides with a large-diameter hole and a medium-diameter hole at two portions of the large-diameter portion and the medium-diameter portion, the sliding part with which the guide pin is integrated is in a two-point support state. Therefore, even if an external force acts in the diametrical direction of the electrode main body against the guide pin projecting from the end surface of the electrode main body due to a collision of a steel plate component, or the like, the amounts of tilt displacement of the guide pin and the sliding part are not substantially a problem. Therefore, the close contact between the stationary inner end surface and the movable end surface is not impaired, and reliable airtightness maintenance can be ensured.

Furthermore, a diameter of the medium-diameter portion becomes close to a diameter of the large-diameter portion, and thus the diameter of the medium-diameter portion can be set large. At the same time, the thickness of the medium-diameter portion can be increased as much as possible. Accordingly, since an external force in the diametrical direction is received by the medium-diameter portion with an increased diameter and an increased thickness, elastic deformation in the medium-diameter portion can be reduced, and the amounts of tilt displacement of the guide pin and the sliding part can be set to a level that is substantially free of problems. It is particularly effective to reduce the amount of elastic deformation by increasing the diameter. Such increase in thickness and increase in diameter of the medium-diameter portion are achieved in correlation with reduction in the width dimension of the movable end surface. That is, increase in thickness and increase in diameter of the medium-diameter portion and increase in surface pressure of the movable end surface are compatible.

Although minute protrusions and recesses remain on the surface of the movable end surface by cutting-finish processing or injection molding, protruding portions of protruding and recessed portions pressed against the stationary inner end surface are in a crushed state due to the above-described improvement in surface pressure, and thus improvement in close contact of the synthetic resin end surface and the metal end surface can be ensured.

The invention according to claim 2 is the electric resistance welding electrode according to claim 1, in which a ratio of a width dimension of the movable end surface to the thickness dimension of the large-diameter portion at the position where the guide pin is inserted is less than 0.5 and more than or equal to 0.3.

When the width dimension of the movable end surface is more than or equal to half of the thickness dimension of the large-diameter portion where the guide pin is inserted, that is, the ratio is 0.5 or more, the close-contact area of the annular movable end surface becomes excessive, and the increase in surface pressure and the pushing of the metal piece as described above are not achieved satisfactorily. Preferably, the upper limit side is less than 0.5. On the other hand, when the ratio is less than 0.3, the close-contact area of the movable end surface becomes too small, the sealing area of cooling air becomes insufficient, and the sealing action becomes slow, which is not preferable in terms of maintaining airtightness. Preferably, the lower limit side is more than or equal to 0.3.

The invention according to claim 3 is a method for maintaining airtightness of an electric resistance welding electrode, the method including:

forming an electrode main body that has a circular cross section by a metal material such as a copper material;

forming a guide pin that has a circular cross section, projects from an end surface of the electrode main body on which a steel plate component is placed, and penetrates a pilot hole of the steel plate component by a heat-resistant hard material such as a metal material or a ceramic material; and forming a sliding part that has a circular cross section, is fitted into a guide hole formed in the electrode main body in a slidable state, and has a central portion in which the guide pin is inserted, by a synthetic resin material, in which the guide hole is constituted of a large-diameter hole, a medium-diameter hole, and a small-diameter hole, a large-diameter portion formed in the sliding part is fitted into the large-diameter hole in a slidable state with substantially no gap, a medium-diameter portion formed in the sliding part is fitted into the medium-diameter hole in a slidable state with substantially no gap, a ventilation gap through which cooling air passes is formed between a small-diameter hole and the guide pin when the guide pin is pushed down by the guide pin that penetrates the small-diameter hole, a movable end surface formed at a boundary portion between the medium-diameter portion and the large-diameter portion of the sliding part is configured to be in close-contact with a stationary inner end surface formed at a boundary portion between the medium-diameter hole and the large-diameter hole of the guide hole, and the stationary inner end surface and the movable end surface are disposed on a virtual plane where a central axis of the electrode main body perpendicularly intersects, a length in the central axis direction of the electrode main body in which the medium-diameter portion is fitted in the medium-diameter hole is set to be shorter than a length in which the guide pin moves backward during welding, a pressurizing unit that presses the movable end surface against the stationary inner end surface is disposed in the guide hole, by a width dimension of the movable end surface seen in a diametrical direction of the electrode main body being less than half of a thickness dimension of the large-diameter portion at a position where the guide pin is inserted, an area of the movable end surface is configured to be small to increase a pressurizing force of the movable end surface against the stationary inner end surface, and a minute metal piece that enters a close-contact position of the movable end surface and the stationary inner end surface is pushed from the movable end surface into a base material of the sliding part, and by the width dimension of the movable end surface seen in the diametrical direction of the electrode main body being less than half of the thickness dimension of the large-diameter portion at the position where the guide pin is inserted, a thickness dimension of the medium-diameter portion is configured to be set large so as to receive an external force that acts on the guide pin in the diametrical direction of the electrode main body by the medium-diameter portion.

Effects of the invention of the method for maintaining airtightness are the same as the effects of the electric resistance welding electrode.

BRIEF DESCRIPTION OF DRAWINGS

FIG. 3C is a cross-sectional view illustrating a state before the metal pieces are pushed in.

FIG. 3D is a cross-sectional view illustrating a state after the metal pieces are pushed in.

DESCRIPTION OF EMBODIMENT

Figure 1A:
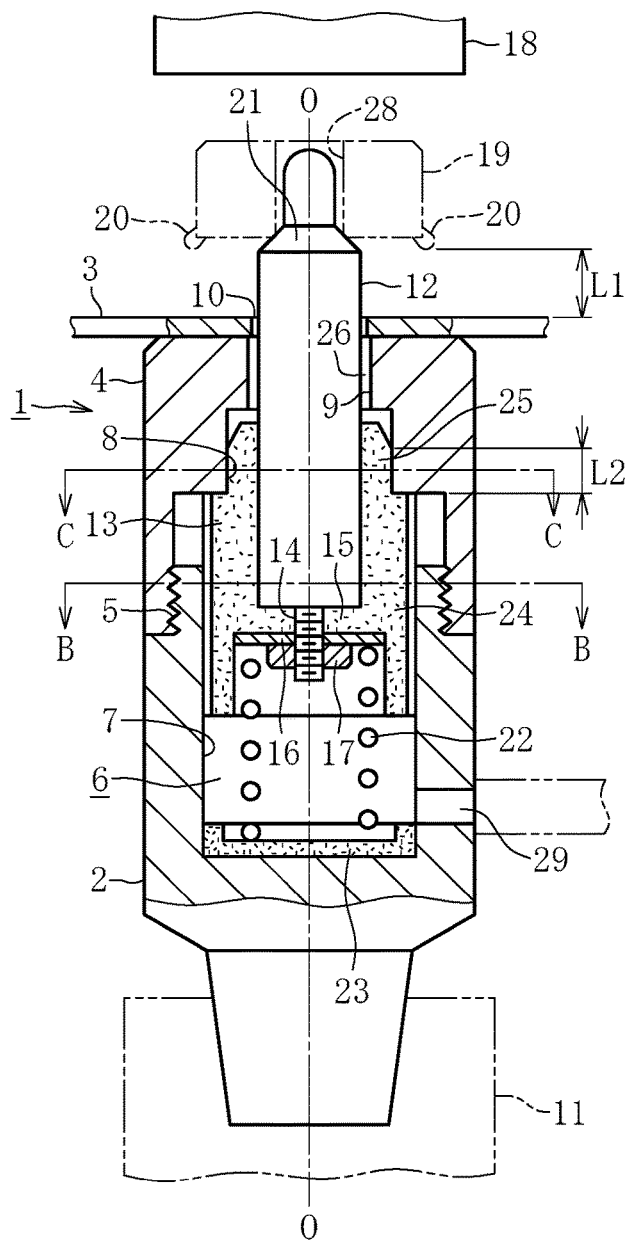
FIG. 1A is a longitudinal sectional view of an entire electrode.

Next, an embodiment for implementing an electric resistance welding electrode and a method for maintaining airtightness according to the present invention will be described.

Embodiment

FIGS. 1A to 4 illustrate an embodiment of the present invention.

First, an electrode main body will be described.

An electrode main body 1 made of a conductive metal material made of a copper alloy such as chrome copper has a cylindrical shape and a circular cross section, and a fixed part 2 to be inserted into a stationary member 11 and a cap part 4 on which a steel plate component 3 is placed are coupled at a screw portion 5 to form the electrode main body 1 having a circular cross section. A guide hole 6 having a circular cross section is formed in the electrode main body 1, and this guide hole 6 is formed of a large-diameter hole 7 formed in the fixed part 2, a medium-diameter hole 8 smaller in diameter than the large-diameter hole 7 and formed in the cap part 4, and a small-diameter hole 9 smaller in diameter than the medium-diameter hole 8. The large-diameter hole 7, the medium-diameter hole 8, and the small-diameter hole 9 are disposed in a coaxial state of being aligned on a central axis O-O of the electrode main body 1. The small-diameter hole 9 smaller in diameter than the medium-diameter hole 8 is provided on the central axis O-O.

A guide pin 12 that has a circular cross section, projects from an end surface of the electrode main body 1 on which the steel plate component 3 is placed, and penetrates a pilot hole 10 of the steel plate component 3 is formed of a metal material such as stainless steel or a heat-resistant hard material such as a ceramic material.

Further, as will be described later, a sliding part 13 having a circular cross section that advances and retreats in a sliding state with respect to the guide hole 6 is formed of an insulating synthetic resin material having excellent heat resistance, for example, polytetrafluoroethylene (trade name: Teflon (registered trademark)). As another material, from polyamide resins, a resin excellent in heat resistance and wear resistance can be employed.

Next, an integrated part of the guide pin and the sliding part will be described.

The guide pin 12 is inserted into a center portion of the sliding part 13 to thereby integrate the guide pin 12 and the sliding part 13. For a structure in which the guide pin 12 is integrated with the sliding part 13, one of various methods such as a method of molding the guide pin 12 together at the time of injection molding of the sliding part 13, a method of providing a connecting bolt structure portion on the guide pin 12, and the like can be employed.

Here, the latter type of the connecting bolt structure portion is employed.

Specifically, a bolt 14 is formed integrally with a lower end portion of the guide pin 12, the bolt 14 is passed through a bottom member 15 of the sliding part 13, and a washer 16 is fitted therewith and tightened with a lock nut 17. The sliding part 13 has an insulating function such that when a movable electrode 18 paired with the electrode main body 1 is operated and welding current is applied, current flows from a welding projection 20 of a nut 19 to the steel plate component 3 only.

Note that the nut 19 is used for projection welding, a screw hole 28 is formed in a center of a square body, and welding projections 20 are provided in four corners. An open end of the screw hole 28 is engaged with a tapered portion 21 of the guide pin 12. Since the nut 19 is in a state of floating from the steel plate component 3 in this manner, a length L1 is left by which the guide pin 12 retracts during welding in which the movable electrode 18 advances.

A compression coil spring 22 is fitted between the washer 16 and an inner bottom surface of the guide hole 6, and a tension thereof acts on the sliding part 13. Note that reference numeral 23 indicates an insulating sheet fitted into the inner bottom surface of the guide hole 6. The tension of the compression coil spring 22 establishes pressurized close contact of a movable end surface with a stationary inner end surface, which will be described later. The compression coil spring 22 is a pressurizing unit, and instead of this, it is also possible to use a pressure of compressed air.

Next, a fitting correspondence between respective portions of the sliding part and respective portions of the guide hole will be described.

The sliding part 13 is formed with a large-diameter portion 24 and a medium-diameter portion 25, and the guide pin 12 having a smaller diameter than the medium-diameter portion 25 is integrated with the sliding part 13. The large-diameter portion 24 is fitted into the large-diameter hole 7 in a slidable state with substantially no gap with an inner surface of the large-diameter hole 7, and the medium-diameter portion 25 is fitted into the medium-diameter hole 8 in a slidable state with substantially no gap with an inner surface of the medium-diameter hole 8. Such "a slidable state with substantially no gap" means a state that when a force in a diametrical direction of the electrode main body 1 acts on the sliding part 13, there is no feeling of rattling such as clattering that gives a feeling of gap, and moreover, sliding is possible in a central axis O-O direction. By the guide pin 12 that penetrates the small-diameter hole 9 and projects from the end surface of the electrode main body 1, a ventilation gap 26 through which cooling air passes when the guide pin 12 is pushed down is formed between the small-diameter hole 9 and the guide pin 12.

A length in the central axis O-O direction of the electrode main body in which the medium-diameter portion 25 is fitted in the medium-diameter hole 8 is set to be shorter than a length in which the guide pin 12 retracts during welding. In this embodiment, a tapered portion 27 is formed on an upper portion of the medium-diameter portion 25, and a length in the central axis O-O direction in which the medium-diameter portion 25 is fitted in the medium-diameter hole 8 is a length L2 that does not include the tapered portion 27. Accordingly, the length L2 in the central axis O-O direction of the electrode main body in which the medium-diameter portion 25 is fitted in the medium-diameter hole 8 is set to be shorter than the length L1 in which the guide pin 12 retracts during welding. When the guide pin 12 is pushed down, first, the ventilation gap is formed between the tapered portion 27 and the medium-diameter hole 8.

Next, an intermittent structure of cooling air will be described.

A vent hole 29 is formed for guiding cooling air to the guide hole 6. In order to secure an air passage at a sliding position of the large-diameter portion 24 and the large-diameter hole 7, a concave groove in the central axis O-O direction can be formed on an outer peripheral surface of the large-diameter portion 24, but as illustrated in FIG. 1B here, a flat surface portion 30 in the central axis O-O direction is formed on an outer peripheral surface of the large-diameter portion 24, and an air passage 31 constituted of the flat surface portion 30 and an arc-shaped inner surface of the large-diameter hole 7 is formed. Such flat portions 30 are formed at intervals of 90 degrees, and air passages are provided at four locations.

An annular stationary inner end surface 32 is formed at a boundary portion between the medium-diameter hole 8 and the large-diameter hole 7 of the guide hole 6. Further, an annular movable end surface 33 is formed at a boundary between the medium-diameter portion 25 and the large-diameter portion 24 of the sliding part 13. The stationary inner end surface 32 and the movable end surface 33 are disposed on a virtual plane where the central axis O-O of the electrode main body 1 perpendicularly intersects, and the movable end surface 33 is in close contact in an annular state with the stationary inner end surface 32 by tension of the compression coil spring 22, and cooling air is sealed by close contact.

Figure 2A:
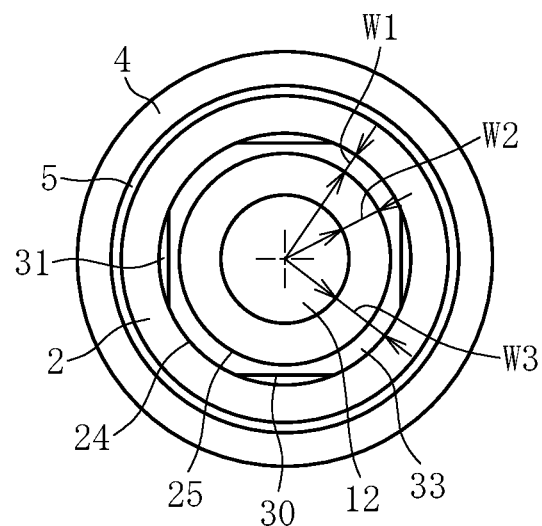
FIG. 2A is a cross-sectional view taken along the line B-B in FIG. 1A illustrating a dimensional relationship of W1 to W3.
Figure 2B:
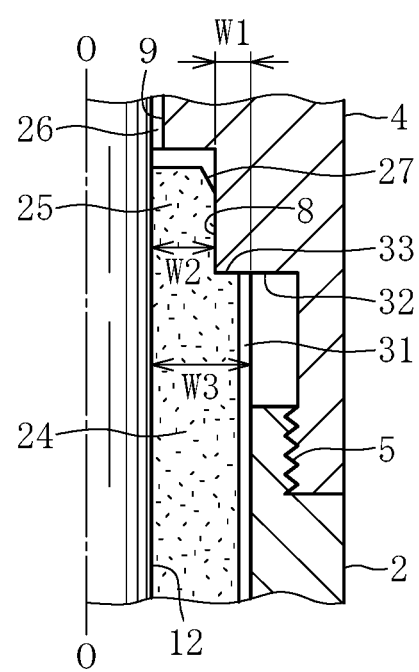
FIG. 2B is a local longitudinal sectional view illustrating a dimensional relationship of W1 to W3.

As illustrated in FIG. 2B, a width of the stationary inner end surface 32 as seen in a diametrical direction of the electrode main body 1 is large, but a width of the portion where the movable end surface 33 is in close contact is narrow, and a close-contact area of the movable end surface 33 is small. This close-contact width is W1 described later.

Next, a width dimension of the movable end surface will be described.

A width dimension W1 of the movable end surface 33 seen in the diametrical direction of the electrode main body 1 is a dimension obtained by subtracting a thickness dimension W2 of the medium-diameter portion 25 from a thickness dimension W3 of the large-diameter portion 24 as seen in FIG. 2A. A thickness dimension of the large-diameter portion 24 at a position where the guide pin 12 is inserted is W3. Then, a thickness dimension of the medium-diameter portion 25 at the position where the guide pin 12 is inserted is W2. Since the sliding part 13 is fitted into the large-diameter hole 7 and the medium-diameter hole 8, a thickness of the sliding part 13 is sectioned into the thickness dimension W3 of the large-diameter portion 24 at the position where the guide pin 12 is inserted, and the thickness dimension W2 of the medium-diameter portion 25 seen in the diametrical direction of the electrode main body 1.

Note that, as is clear from FIG. 2A, the close-contact area of the movable end surface 33 is reduced by a cross-sectional area of the air passage 31. This reduction in the width dimension W1 of the movable end surface 33 caused by formation of the air passage 31 is determined so as not to impair sealing of cooling air. Further, in FIG. 2A, hatchings of a metal cross section and satin finish of the synthetic resin portion are not illustrated for easiness of viewing.

Next, dimensions of respective parts will be described.

Sizes of respective parts vary depending on a size of the electrode. Here, a square projection nut 19 having a length and a width of 12 mm each and a thickness of 7.2 mm is electrically welded to a steel plate component 3 having a thickness of 0.7 mm.

An example of dimensions of the electrode to which the projection nut 19 is welded is as follows.

Diameter dimension of the guide pin 12=9.4 mm
Outer dimension of the large-diameter portion 24=17.8 mm
Thickness dimension W3=4.2 mm of the large-diameter portion at the position where the guide pin is inserted
Outer dimension=14.3 mm of the medium-diameter portion 25
Width dimension W1=1.8 mm of the movable end surface seen in the diametrical direction of the electrode main body
Ratio=0.43 of the width dimension W1 of the movable end surface to the thickness dimension W3 of the large-diameter portion
Length L2=2.4 mm that the medium-diameter portion 25 is fitted in the medium-diameter hole 8
Length L1=4.4 mm that the guide pin retracts during welding The width dimension W1 of the movable end surface 33 seen in the diametrical direction of the electrode main body 1 is less than half of the thickness dimension W3 of the large-diameter portion 24 at the position where the guide pin 12 is inserted, and here the ratio of W1 to W3 is 0.43.

Next, a behavior of a minute metal piece will be described.

When the guide pin is pushed down, and the movable end surface is separated from the stationary inner end surface and a gap is formed between both end surfaces, cooling air circulates energetically, and minute metal pieces and carbides, and the like are sent out from a melting local area to the outside of the electrode by airflow. Normally, the sending out is in this manner, but when metal is melted, minute metal pieces that have scattered energetically from a melted portion due to rapid air expansion may collide with an outer peripheral surface of the guide pin and bounce back, move against airflow, and reach the movable end surface. In such a phenomenon, it is conceivable that movement against airflow becomes possible because dynamic pressure of the airflow acting on a metal piece is low when the metal piece is minute. When such a metal piece adheres to the surface of the movable end surface, a gap is formed between the stationary inner end surface and the movable end surface when the guide pin returns to the standby position, and sealing for circulation of the cooling air is no longer possible. The abnormal behavior of a metal piece as described above does not normally occur if circulation of the cooling air is maintained in good condition, but may occur with a low probability due to some kind of cause as described above.

Fine metal pieces 34 scattered from the melted portion are usually round particles or particles having angular portions, each of which has a diameter of about 0.1 to 0.2 mm. When such a metal piece 34 reaches the movable end surface 33 for some reason as described above, the metal piece 34 stops in a state of adhering to the surface of the movable end surface 33. Although the flow of cooling air continues even at the time of this stop, the metal piece 34 stops on the surface of the movable end surface 33 conceivably because the metal piece 34 is partially buried or stuck in and projecting from the end surface 33 made of synthetic resin material as illustrated in FIG. 3C.

Figure 3A:
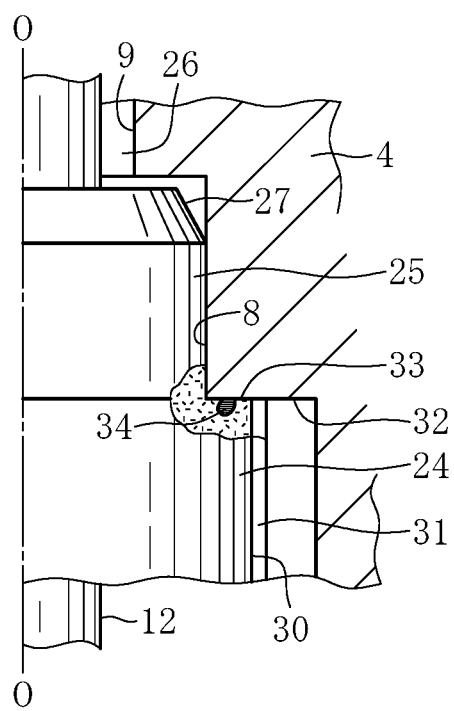
FIG. 3A is a cross-sectional view illustrating a pushing state of a metal piece.
Figure 3B:
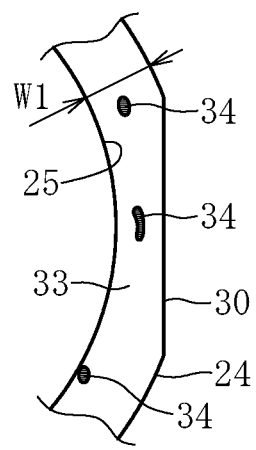
FIG. 3B is a partial plan view of a movable end surface illustrating presence of metal pieces.
Figure 3C:
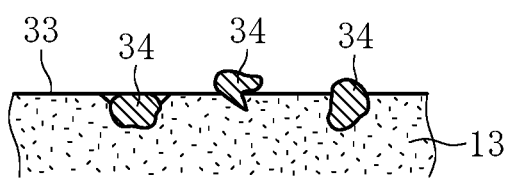
Figure 3D:
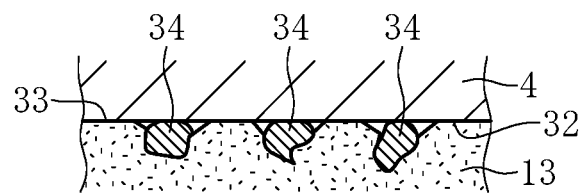

When the sliding part 13 is pushed up in such a state of FIG. 3C, the movable end surface 33 is pressed against the stationary inner end surface 32 having a metal surface, and the metal piece 34 projecting from the movable end surface 33 is pushed into a base material of the movable end surface 33. That is, since the movable end surface 33 side is made of synthetic resin, the metal piece 34 is relatively buried in the base material of the sliding part 13. Such a buried state is illustrated in FIG. 3D.

A seating area of the movable end surface 33 is a close-contact area with respect to the stationary inner end surface 32. This area has a width dimension of the movable end surface 33 seen in the diametrical direction of the electrode main body 1 that is less than half of a thickness of the large-diameter portion 24 at the position where the guide pin 12 is inserted, and W1/W3 is 0.43 as a specific numerical value in the present embodiment. By setting 0.43 in this manner, the width dimension of the movable end surface 33 is reduced, and the total close-contact area of the movable end surface 33 is set small. Along with this, a pressurizing force per unit area, that is, surface pressure increases, and the minute metal piece 34 having reached the close-contact position is sandwiched between the stationary inner end surface 32 that is a metal surface and the movable end surface 33 that is a surface made of a synthetic resin material. The metal piece 34 is brought to a state of being embedded in the soft base material of the sliding part 13, and no gap is formed between the stationary inner end surface 32 and the movable end surface 33, thereby reliably maintaining airtightness and preventing cooling air leakage.

As a result of performing a test of welding nuts to the steel plate component 3 with W1/W3 set to 0.43, there was no air leakage even after 100,000 times of welding, that is, welding of 100,000 nuts. Thus, it is judged that the electrode can withstand use in an automobile body assembly process or the like. Further, similar test results were obtained when W1/W3 was set to 0.45 or 0.48.

When W1/W3 is 0.5 or more, the close-contact area of the movable end surface 33 becomes excessive, and due to accompanying decrease in surface pressure, the force that presses the metal piece 34 from the surface of the movable end surface 33 into the base material of the sliding part 13 becomes insufficient. When such insufficiency occurred, a gap was formed between the movable end surface 33 and the stationary inner end surface 32 when the guide pin 12 was in a projecting state, and air leakage occurred. Therefore, it is appropriate to set W1/W3 to less than 0.5.

Conversely, by setting W1/W3 to 0.26 as a lower limit value, the width dimension of the movable end surface 33 is remarkably reduced, and the total contact area of the movable end surface 33 is set to be significantly smaller. Along with this, the pressurizing force per unit area, that is, the surface pressure increases, and the minute metal piece 34 having reached the close-contact position is sandwiched between the stationary inner end surface 32 that is a metal surface and the movable end surface 33 that is a surface made of a synthetic resin material. The metal piece 34 is brought to a state of being embedded in the soft base material of the sliding part 13.

However, since the width direction dimension of the movable end surface 33 becomes short, the close-contact width W1 of the movable end surface 33 becomes excessively short, and it is difficult to ensure a sufficient sealing action. Further, when the dimension in the width direction of the movable end surface 33 became short, when a phenomenon occurred such that a large metal piece 34 adheres in a state of crossing the width W1 of the movable end surface 33, there was a metal piece 34 that was not completely buried in the surface of the movable end surface 33. Further, even when the metal piece was buried, it was recognized that a groove-like void was formed in the width direction of the movable end surface 33 due to deformation of the synthetic resin material at the time of being buried. Due to these phenomena, it was recognized that even when the movable end surface 33 was in close contact with the stationary inner end surface 32, air leakage occurred and airtightness maintenance could not be achieved.

As a result of performing the nut welding test as described above with W1/W3 set to 0.26, air leakage occurred from the number of weldings around 25,000 times. The cause of this is conceivably the above-described phenomenon of excessively short W1. Further, when W1/W3 was set to 0.28, an unfavorable test result was obtained.

On the other hand, when W1/W3 is 0.3 or more, it is judged that the close-contact area of the movable end surface 33 is appropriately reduced, and due to accompanying increase in surface pressure, the force that presses the metal piece 34 from the surface of the movable end surface 33 into the base material of the sliding part 13 is sufficiently obtained as an appropriate value. Together with this, air leakage accompanying the above-described phenomenon of excessively short W1 could be avoided. Therefore, it is appropriate to set W1/W3 to 0.3 or more.

Next, a buffer function of the medium-diameter portion will be described.

In order to receive an external force in the diametrical direction that acts on the guide pin 12, it is advantageous to increase the diameter of the medium-diameter portion 25 as much as possible and increase the thickness as much as possible. The thickness increase and the diameter increase of the medium-diameter portion 25 are achieved by setting the width dimension W1 of the movable end surface 33 to less than half of the thickness dimension W3 of the large-diameter portion 24.

When an operator fails in handling and the steel plate component 3 collides with the guide pin 12 from the diametrical direction of the electrode main body 1, the guide pin 12 tends to tilt, but since the width dimension W1 of the movable end surface 33 is set so that the diameter of the medium-diameter portion 25 becomes large, a force per unit area acting on the cylindrical surface of the medium-diameter portion 25 is reduced, and the inclination angle does not become a substantial problem. Furthermore, the amount of compressive deformation of the medium-diameter portion 25 is reduced by reducing the force, which is effective for reducing the tilt angle.

Next, another case example will be described.

Figure 4:
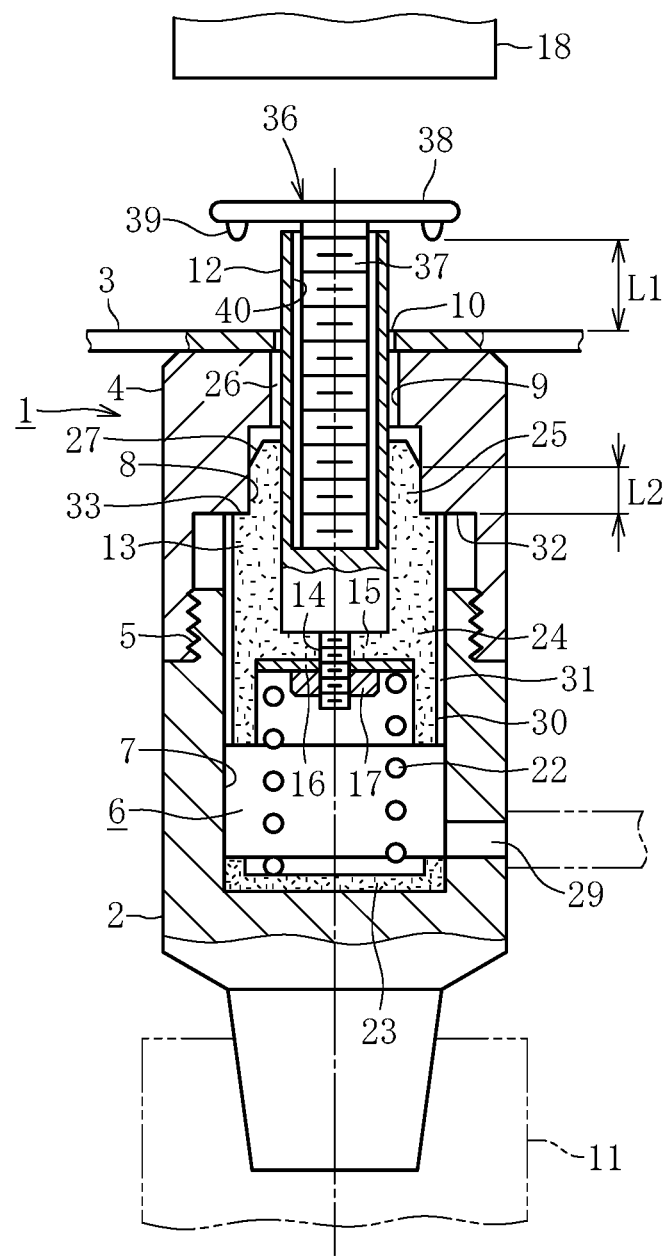
FIG. 4 is a cross-sectional view of a projection bolt.

The above example is a case of a projection nut, but an example illustrated in FIG. 4 is a case of a projection bolt. A projection bolt 36 is constituted of a shaft portion 37 in which a male screw is formed, a circular flange 38 integrated with the shaft portion 37, and a welding projection 39 provided on a lower surface of the flange 38. The guide pin 12 has a tubular hollow shape and is provided with a receiving hole 40 into which the shaft portion 37 is inserted. The other configuration is the same as that of the previous example including any portion that is not illustrated, and the same reference numerals are used for members having similar functions.

Next, operation of the electrode will be described.

Figure 1B:
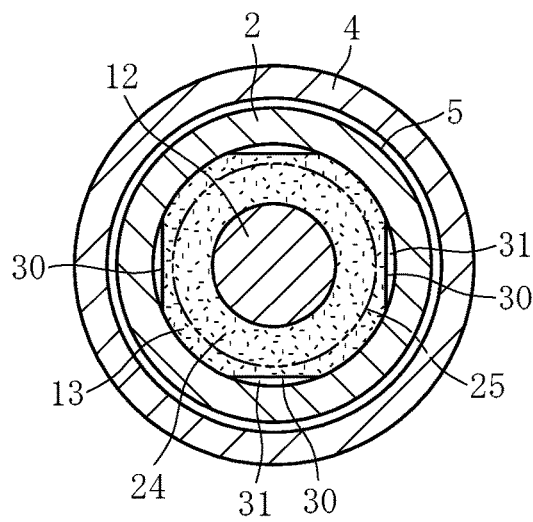
FIG. 1B is a cross-sectional view taken along a line B-B in FIG. 1A.
Figure 1C:
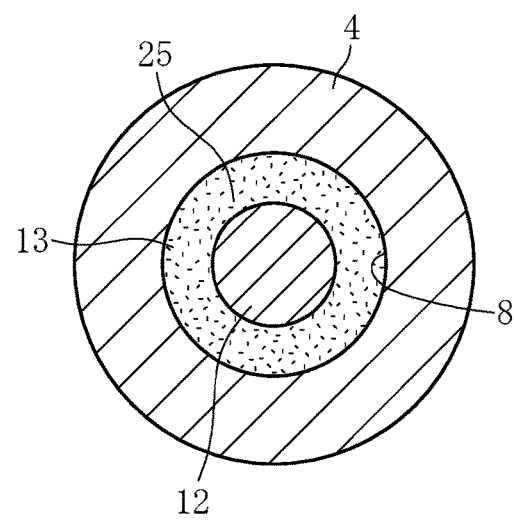
FIG. 1C is a cross-sectional view taken along a line C-C in FIG. 1A.

FIG. 1A illustrates a state that the movable end surface 33 is in close contact with the stationary inner end surface 32 due to tension of the compression coil spring 22 and seals flow of cooling air. At this time, if a minute metal piece 34 is interposed between the movable end surface 33 and the stationary inner end surface 32, airtightness is maintained by the pushing operation described with reference to FIGS. 3.

When the movable electrode 18 advances and the interval L1 disappears, the medium-diameter portion 25 having entered the medium-diameter hole 8 comes out of the medium-diameter hole 8, and a passage for cooling air is formed. The cooling air diverges to the outside through the vent hole 29, the air passage 31, the medium-diameter hole 8, and the ventilation gap 26, and through the gap between the lower surface of the nut 19 and the steel plate component 3. By this airflow, impurities such as spatter are removed in a direction to separate from the electrode. When the guide pin 12 is pushed down, an air passage is first formed by the tapered portion 27. An air passage having a large flow path area is formed in an initial stage due to a slope of the tapered portion 27, which is preferable for reliable cooling air circulation. Further, when the guide pin 12 returns, the medium-diameter portion 25 smoothly enters the medium-diameter hole 8 by a guide function of the tapered portion 27. The operation is the same in a case of the projection bolt 36 illustrated in FIG. 4.

Operations and effects of the embodiment described above are as follows.

The width dimension W1 of the movable end surface 33 seen in the diametrical direction of the electrode main body 1 is set to be less than half of the thickness dimension W3 of the large-diameter portion 24 at the position where the guide pin 12 is inserted. For this reason, the area of the movable end surface 33 is reduced to increase a pressurizing force of the movable end surface 33 against the stationary inner end surface 32, and a minute metal piece 34 that has entered the close-contact area between the movable end surface 33 and the stationary inner end surface 32 is pushed from the movable end surface 33 into the base material of the sliding part 13.

Since the close-contact area of the movable end surface 33 with respect to the stationary inner end surface 32 is reduced, the pressurizing force per unit area, that is, the surface pressure is increased. Therefore, the minute metal piece 34 that has reached the close-contact position is sandwiched between the stationary inner end surface 32 that is a metal surface and the movable end surface 33 that is a surface made of the synthetic resin material, and the metal piece 34 is brought to a state of being embedded in the soft base material of the sliding part 13, and no gap is formed between the stationary inner end surface 32 and the movable end surface 33.

When the guide pin 12 is pushed down and the movable end surface 33 is separated from the stationary inner end surface 32 and a gap is formed between both the end surfaces, cooling air circulates energetically, and minute metal pieces 34 and carbides, and the like are sent out from a melting local area to the outside of the electrode by airflow. Normally, the sending out is in this manner, but when metal is melted, minute metal pieces 34 that have scattered energetically from a melted portion due to rapid air expansion may collide with an outer peripheral surface of the guide pin 12 and bounce back, move against airflow, and reach the movable end surface 33. In such a phenomenon, it is conceivable that movement against airflow becomes possible because dynamic pressure of the airflow acting on a metal piece 34 is low when the metal piece 34 is minute. When such a metal piece 34 adheres to the surface of the movable end surface 33, a gap is formed between the stationary inner end surface 32 and the movable end surface 33 when the guide pin 12 returns to the standby position, and sealing for circulation of the cooling air is no longer possible. The abnormal behavior of a metal piece 34 as described above does not normally occur if circulation of the cooling air is maintained in good condition, but may occur with a low probability due to some kind of cause as described above.

However, in the present embodiment, as described above, the metal piece 34 is brought to a state of being embedded in the soft base material of the sliding part 13, and no gap is formed between the stationary inner end surface 32 and the movable end surface 33. Thus, it is possible to ensure complete airtightness and avoid economic loss due to air leakage. Furthermore, when air leakage continues, noise accompanying air ejection is generated and working environment for the operator is deteriorated. However, the environment is improved by maintaining airtightness as described above.

In other words, by synergizing increasing of the surface pressure by reducing the area of the movable end surface 33 made of a synthetic resin material and pressing of the minute metal piece 34 strongly against the movable end surface 33, the metal piece 34 is embedded from the movable end surface 33 into the base material of the sliding part 13.

The width dimension W1 of the movable end surface 33 seen in the diametrical direction of the electrode main body 1 is set to be less than half of the thickness dimension W3 of the large-diameter portion 24 at the position where the guide pin 12 is inserted. Thus, the thickness dimension of the medium-diameter portion 25 is set large to operate so as to receive an external force acting on the guide pin 12 in the diametrical direction of the electrode main body 1.

Since the sliding part 13 slides with the large-diameter hole 7 and the medium-diameter hole 8 at two portions of the large-diameter portion 24 and the medium-diameter portion 25, the sliding part 13 with which the guide pin 12 is integrated is in a two-point support state. Therefore, even if an external force acts in the diametrical direction of the electrode main body 1 on the guide pin 12 projecting from the end surface of the electrode main body 1 due to a collision of the steel plate component 3, or the like, the amounts of tilt displacement of the guide pin 12 and the sliding part 13 are not substantially a problem. Therefore, the close contact between the stationary inner end surface 32 and the movable end surface 33 is not impaired, and reliable airtightness maintenance can be ensured.

Furthermore, the diameter of the medium-diameter portion 25 becomes close to the diameter of the large-diameter portion 24, and thus the diameter of the medium-diameter portion 25 can be set large. At the same time, the thickness of the medium-diameter portion 25 can be increased as much as possible. Accordingly, since an external force in the diametrical direction is received by the medium-diameter portion 25 with an increased diameter and an increased thickness, elastic deformation in the medium-diameter portion 25 can be reduced, and the amounts of tilt displacement of the guide pin 12 and the sliding part 13 can be set to a level that is substantially free of problems. It is particularly effective to reduce the amount of elastic deformation by increasing the diameter. Such increase in thickness and increase in diameter of the medium-diameter portion 25 are achieved in correlation with reduction in the width dimension W1 of the movable end surface 33. That is, increase in thickness and increase in diameter of the medium-diameter portion 25 and increase in surface pressure of the movable end surface 33 are compatible.

Although minute protrusions and recesses remain on the surface of the movable end surface 33 by cutting-finish processing or injection molding, protruding portions of protruding and recessed portions pressed against the stationary inner end surface 32 are in a crushed state due to the above-described improvement in surface pressure, and thus improvement in close contact of the synthetic resin end surface and the metal end surface can be ensured.

The ratio of the width dimension W1 of the movable end surface 33 to the thickness dimension W3 of the large-diameter portion 24 at the position where the guide pin 12 is inserted is less than 0.5 and more than or equal to 0.3.

When the width dimension W1 of the movable end surface 33 is more than or equal to half of the thickness dimension W3 of the large-diameter portion 24 at the position where the guide pin 12 is inserted, that is, the ratio is 0.5 or more, the close-contact area of the annular movable end surface 33 becomes excessive, and the increase in surface pressure and the pushing of the metal piece 34 as described above are not achieved satisfactorily. Preferably, the upper limit side is less than 0.5. On the other hand, when the ratio is less than 0.3, the close-contact area of the movable end surface 33 becomes too small, the sealing area of cooling air becomes insufficient, and the sealing action becomes slow, which is not preferable in terms of maintaining airtightness. Preferably, the lower limit side is more than or equal to 0.3.

A method for maintaining airtightness of an electric resistance welding electrode includes:

forming an electrode main body that has a circular cross section by a metal material such as a copper material;

forming a guide pin that has a circular cross section, projects from an end surface of the electrode main body on which a steel plate component is placed, and penetrates a pilot hole of the steel plate component by a heat-resistant hard material such as a metal material or a ceramic material; and forming a sliding part that has a circular cross section, is fitted into a guide hole formed in the electrode main body in a slidable state, and has a central portion in which the guide pin is inserted, by a synthetic resin material, in which the guide hole is constituted of a large-diameter hole, a medium-diameter hole, and a small-diameter hole, a large-diameter portion formed in the sliding part is fitted into the large-diameter hole in a slidable state with substantially no gap, a medium-diameter portion formed in the sliding part is fitted into the medium-diameter hole in a slidable state with substantially no gap, a ventilation gap through which cooling air passes is formed between a small-diameter hole and the guide pin when the guide pin is pushed down by the guide pin that penetrates the small-diameter hole, a movable end surface formed at a boundary portion between the medium-diameter portion and the large-diameter portion of the sliding part is configured to be in close-contact with a stationary inner end surface formed at a boundary portion between the medium-diameter hole and the large-diameter hole of the guide hole, and the stationary inner end surface and the movable end surface are disposed on a virtual plane where a central axis of the electrode main body perpendicularly intersects, a length in the central axis direction of the electrode main body in which the medium-diameter portion is fitted in the medium-diameter hole is set to be shorter than a length in which the guide pin moves backward during welding, a pressurizing unit that presses the movable end surface against the stationary inner end surface is disposed in the guide hole, by a width dimension of the movable end surface seen in a diametrical direction of the electrode main body being less than half of a thickness dimension of the large-diameter portion at a position where the guide pin is inserted, an area of the movable end surface is configured to be small to increase a pressurizing force of the movable end surface against the stationary inner end surface, and a minute metal piece that enters a close-contact position of the movable end surface and the stationary inner end surface is pushed from the movable end surface into a base material of the sliding part, and by the width dimension of the movable end surface seen in the diametrical direction of the electrode main body being less than half of the thickness dimension of the large-diameter portion at the position where the guide pin is inserted, a thickness dimension of the medium-diameter portion is configured to be set large so as to receive an external force that acts on the guide pin in the diametrical direction of the electrode main body by the medium-diameter portion.

Effects of the embodiment of the method for maintaining airtightness are the same as the effects of the electric resistance welding electrode.

INDUSTRIAL APPLICABILITY

As described above, in an electrode and a method for maintaining airtightness of the present invention, adverse effects associated with intervention of a minute metal piece are eliminated by increasing a surface pressure of a movable end surface formed on a sliding part made of a synthetic resin material, and misalignment and tilting of a guide pin is substantially eliminated by selecting a sliding state of the sliding part. Therefore, the invention can be used in a wide range of industrial fields such as automobile body welding processes and sheet metal welding processes of home appliances.

REFERENCE SIGNS LIST 1 electrode main body
6 guide hole
7 large-diameter hole
8 medium-diameter hole
9 small-diameter hole
12 guide pin
13 sliding part
18 movable electrode
19 projection nut
24 large-diameter portion
25 medium-diameter portion
26 ventilation gap
29 vent hole
31 air passage
32 stationary inner end surface
33 movable end surface
34 metal piece
36 projection bolt
40 receiving hole
W1 width dimension of movable end surface
W2 thickness dimension of medium-diameter portion
W3 thickness dimension of large-diameter portion
L1 retraction length of guide pin
L2 insertion length of medium-diameter portion

The invention claimed is:

1. An electric resistance welding electrode comprising:

an electrode main body that has a circular cross section and is constituted of a metal material;

a guide pin that has a circular cross section, projects from an end surface of the electrode main body on which a steel plate component is placed, penetrates a pilot hole of the steel plate component, and is constituted of a heat-resistant hard material; and a sliding part that has a circular cross section, is fitted into a guide hole formed in the electrode main body in a slidable state, has a central portion in which the guide pin is inserted, and is constituted of a synthetic resin material, wherein the guide hole is constituted of a large-diameter hole, a medium-diameter hole, and a small-diameter hole, a large-diameter portion formed in the sliding part is fitted into the large-diameter hole in a slidable state with no gap, a medium-diameter portion formed in the sliding part is fitted into the medium-diameter hole in a slidable state with no gap, a ventilation gap through which cooling air passes is formed between the small-diameter hole and the guide pin when the guide pin is pushed down by the guide pin that penetrates the small-diameter hole, a movable end surface formed at a boundary portion between the medium-diameter portion and the large-diameter portion of the sliding part is configured to be in close-contact with a stationary inner end surface formed at a boundary portion between the medium-diameter hole and the large-diameter hole of the guide hole, and the stationary inner end surface and the movable end surface are disposed on a virtual plane where a central axis of the electrode main body perpendicularly intersects, a length in a direction of the central axis of the electrode main body in which the medium-diameter portion is fitted in the medium-diameter hole is set to be shorter than a length in which the guide pin moves backward during welding, a pressurizing unit that presses the movable end surface against the stationary inner end surface is disposed in the guide hole, by a width dimension of the movable end surface seen in a diametrical direction of the electrode main body being less than half of a thickness dimension of the large-diameter portion at a position where the guide pin is inserted, an area of the movable end surface is configured to be small to increase a pressurizing force of the movable end surface against the stationary inner end surface, and a minute metal piece that enters a close-contact position of the movable end surface and the stationary inner end surface is pushed from the movable end surface into a base material of the sliding part, and by the width dimension of the movable end surface seen in the diametrical direction of the electrode main body being less than half of the thickness dimension of the large-diameter portion at the position where the guide pin is inserted, a thickness dimension of the medium-diameter portion is configured to be set large so as to receive an external force that acts on the guide pin in the diametrical direction of the electrode main body.

2. The electric resistance welding electrode according to claim 1, wherein a ratio of a width dimension of the movable end surface to the thickness dimension of the large-diameter portion at the position where the guide pin is inserted is less than 0.5 and more than or equal to 0.3.

3. A method for maintaining airtightness of an electric resistance welding electrode, the method comprising:

forming an electrode main body that has a circular cross section by a metal material;

forming a guide pin that has a circular cross section, projects from an end surface of the electrode main body on which a steel plate component is placed, and penetrates a pilot hole of the steel plate component by a heat-resistant hard material; and forming a sliding part that has a circular cross section, is fitted into a guide hole formed in the electrode main body in a slidable state, and has a central portion in which the guide pin is inserted, by a synthetic resin material, wherein the guide hole is constituted of a large-diameter hole, a medium-diameter hole, and a small-diameter hole, a large-diameter portion formed in the sliding part is fitted into the large-diameter hole in a slidable state with no gap, a medium-diameter portion formed in the sliding part is fitted into the medium-diameter hole in a slidable state with no gap, a ventilation gap through which cooling air passes is formed between the small-diameter hole and the guide pin when the guide pin is pushed down by the guide pin that penetrates the small-diameter hole, a movable end surface formed at a boundary portion between the medium-diameter portion and the large-diameter portion of the sliding part is configured to be in close-contact with a stationary inner end surface formed at a boundary portion between the medium-diameter hole and the large-diameter hole of the guide hole, and the stationary inner end surface and the movable end surface are disposed on a virtual plane where a central axis of the electrode main body perpendicularly intersects, a length in a direction of the central axis of the electrode main body in which the medium-diameter portion is fitted in the medium-diameter hole is set to be shorter than a length in which the guide pin moves backward during welding, a pressurizing unit that presses the movable end surface against the stationary inner end surface is disposed in the guide hole, by a width dimension of the movable end surface seen in a diametrical direction of the electrode main body being less than half of a thickness dimension of the large-diameter portion at a position where the guide pin is inserted, an area of the movable end surface is configured to be small to increase a pressurizing force of the movable end surface against the stationary inner end surface, and a minute metal piece that enters a close-contact position of the movable end surface and the stationary inner end surface is pushed from the movable end surface into a base material of the sliding part, and by the width dimension of the movable end surface seen in the diametrical direction of the electrode main body being less than half of the thickness dimension of the large-diameter portion at the position where the guide pin is inserted, a thickness dimension of the medium-diameter portion is configured to be set large so as to receive an external force that acts on the guide pin in the diametrical direction of the electrode main body by the medium-diameter portion.

4. The electric resistance welding electrode according to claim 1, wherein the metal material of the electrode main body is a copper material.

5. The electric resistance welding electrode according to claim 1, wherein the heat-resistant hard material of the guide pin is a metal material or a ceramic material.

6. The method according to claim 3, wherein the metal material of the electrode main body is a copper material.

7. The method according to claim 3, wherein the heat-resistant hard material of the guide pin is a metal material or a ceramic material.

* * * * *